United States Patent
Allen

(10) Patent No.: US 10,743,554 B1
(45) Date of Patent: Aug. 18, 2020

(54) OYSTER SHUCKING MITT

(71) Applicant: William L. Allen, Auburn, AL (US)

(72) Inventor: William L. Allen, Auburn, AL (US)

(*) Notice: Subject to any disclaimer, the term of this patent is extended or adjusted under 35 U.S.C. 154(b) by 84 days.

(21) Appl. No.: 16/182,080

(22) Filed: Nov. 6, 2018

(51) Int. Cl.
*A41D 19/01* (2006.01)
*A22C 29/04* (2006.01)
*A41D 19/00* (2006.01)
*A41D 19/015* (2006.01)

(52) U.S. Cl.
CPC ........ *A22C 29/046* (2013.01); *A41D 19/0003* (2013.01); *A41D 19/0034* (2013.01); *A41D 19/01* (2013.01); *A41D 19/015* (2013.01); *A41D 2300/32* (2013.01)

(58) Field of Classification Search
CPC ..... A22C 29/046; A22C 29/043; A22C 29/04; A22C 29/024–027; A22C 29/003; A22C 29/005–006; A41D 19/01505
USPC .......................................................... 2/158
See application file for complete search history.

(56) References Cited

U.S. PATENT DOCUMENTS

| | | | |
|---|---|---|---|
| 1,773,440 A | 8/1930 | Sbrolla | |
| 2,695,999 A | 12/1954 | Arnold | |
| 3,031,680 A * | 5/1962 | Compiano | A63B 71/148 2/159 |
| 4,617,684 A | 10/1986 | Green et al. | |
| 4,747,163 A * | 5/1988 | Dzierson | A41D 19/01523 2/161.1 |
| 4,754,499 A * | 7/1988 | Pirie | A41D 13/082 2/20 |
| 5,079,776 A * | 1/1992 | Crawford | A63B 71/141 2/162 |
| 5,566,390 A * | 10/1996 | Clancy | A41D 13/084 2/16 |
| D380,874 S * | 7/1997 | Caswell | D2/617 |
| 6,178,554 B1 | 1/2001 | Pake et al. | |
| 6,487,726 B1 | 12/2002 | Sitiku | |
| 6,691,315 B1 * | 2/2004 | Clarke | A41D 19/01523 2/18 |

* cited by examiner

*Primary Examiner* — Timothy K Trieu
(74) *Attorney, Agent, or Firm* — George L Williamson

(57) ABSTRACT

Method and apparatus for a mitt for attachment to a hand of a user to facilitate the shucking of an oyster. The mitt is made of strong flexible material and includes a flat palm pad portion having a plurality of finger loops attached thereto so that the fingers of the hand of a user can be placed through the loops so that the palm pad portion can be held securely to the hand of the user. The palm pad includes a rear portion disposed near a wrist of a user having an adjustable strap attached thereto which encircles the wrist of the user for securing the mitt to the hand of the user and includes hook and loop material. A reinforcing planar member is attached to an underside of the palm pad portion for reinforcing the palm pad portion and for contacting and gripping the shell of an oyster.

9 Claims, 3 Drawing Sheets

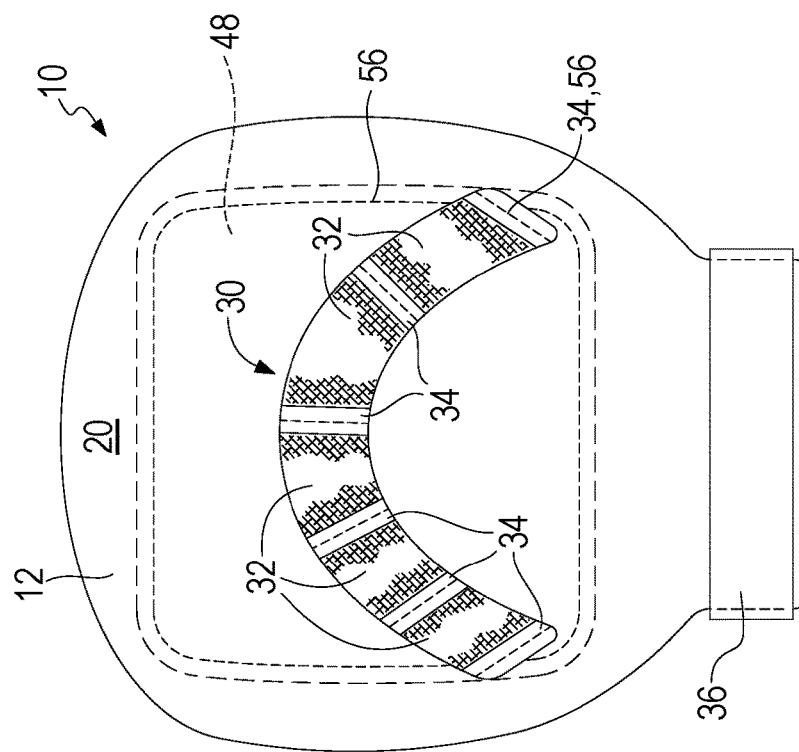
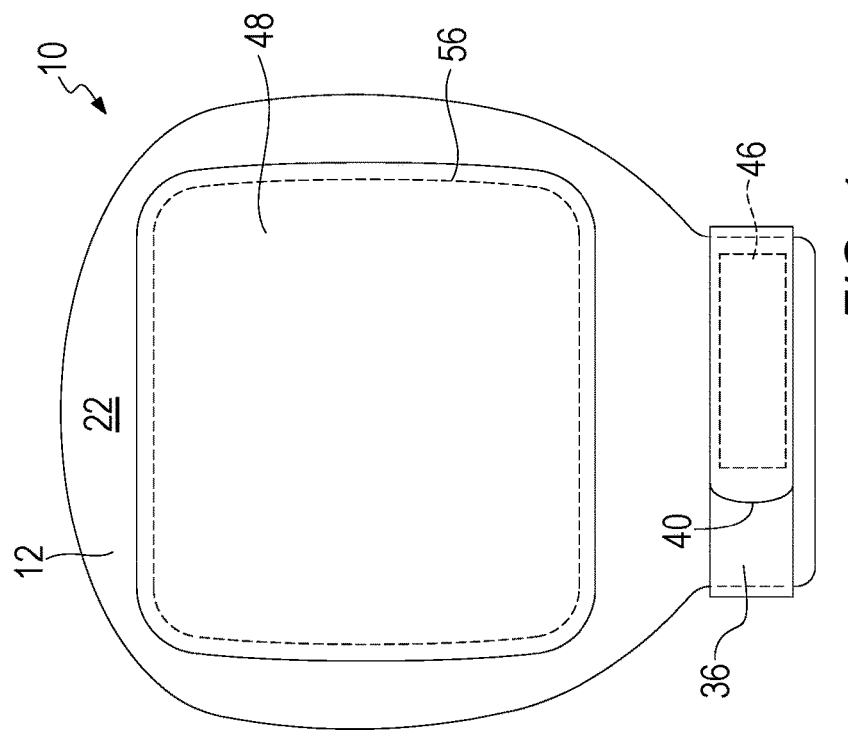
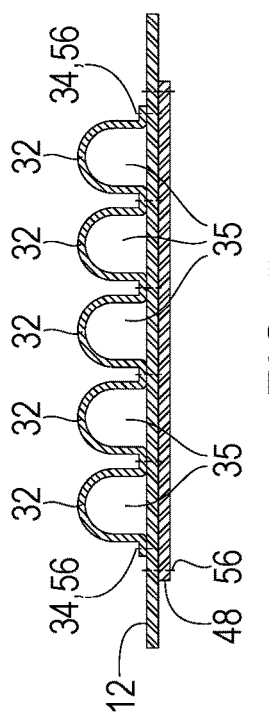

OYSTER SHUCKING MITT

BACKGROUND OF THE INVENTION

Field of the Invention

The present invention relates generally to gloves and, more particularly, is concerned with an oyster shucking mitt.

Description of the Related Art

Devices relevant to the present invention have been described in the related art; however, none of the related art devices disclose the unique features of the present invention. In U.S. Pat. No. 6,178,554 dated Jan. 30, 2001, Pake, et al., disclosed a hand protector. In U.S. Pat. No. 1,773,440 dated Aug. 19, 1930, Sbrolla disclosed a swimming glove. In U.S. Pat. No. 2,695,999 dated Dec. 7, 1954, Arnold disclosed a hand shield. In U.S. Pat. No. 4,617,684 dated Oct. 21, 1986, Green, et al., disclosed a protective palm pad. In U.S. Pat. No. 4,754,499 dated Jul. 5, 1988, Pirie disclosed a gripper pads for hands. In U.S. Pat. No. 6,487,726 dated Dec. 3, 2002, Sitiku disclosed a mitt for giving a massage.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a mitt for attachment to a hand of a user to facilitate the shucking of an oyster. The present invention is made of rubber or similar strong flexible material and includes a flat palm pad portion having a plurality of finger loops attached thereto so that the fingers of the hand of a user can be placed through the loops so that the palm pad portion can be held securely to the hand of the user. The palm pad includes a narrowed rear portion which is disposed near a wrist of a user having a strap attached thereto which encircles the wrist of the user for securing the mitt to the hand of the user and includes hook and loop material disposed on the strap so that the ends of the strap can be adjustably secured around the wrist of the user so as to be adaptable to fit users with different size hands and wrists. A reinforcing planar member also made of flexible material similar to the pad portion is attached to an underside of the palm pad portion for reinforcing the palm pad portion and for contacting and gripping the shell of an oyster.

An object of the present invention is to provide a mitt for attachment to a hand of a user to allow an oyster to be held tightly therein so that the oyster can be shucked or opened by the user. A further object of the present invention is to provide an oyster shucking mitt for protecting the hand of a user. A further object of the present invention is to provide an oyster shucking mitt which can be easily cleaned after an oyster is shucked using the present invention. A further object of the present invention is to provide an oyster shucking mitt which can be easily and securely attached to a hand of a user. A further object of the present invention is to provide an oyster shucking mitt which can be easily operated by a user. A further object of the present invention is to provide an oyster shucking mitt which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 3 is a top view of the present invention.

FIG. 4 is a bottom view of the present invention.

FIG. 5 is a cross sectional view of the finger loops of the present invention.

LIST OF REFERENCE NUMERALS

Figure 1:
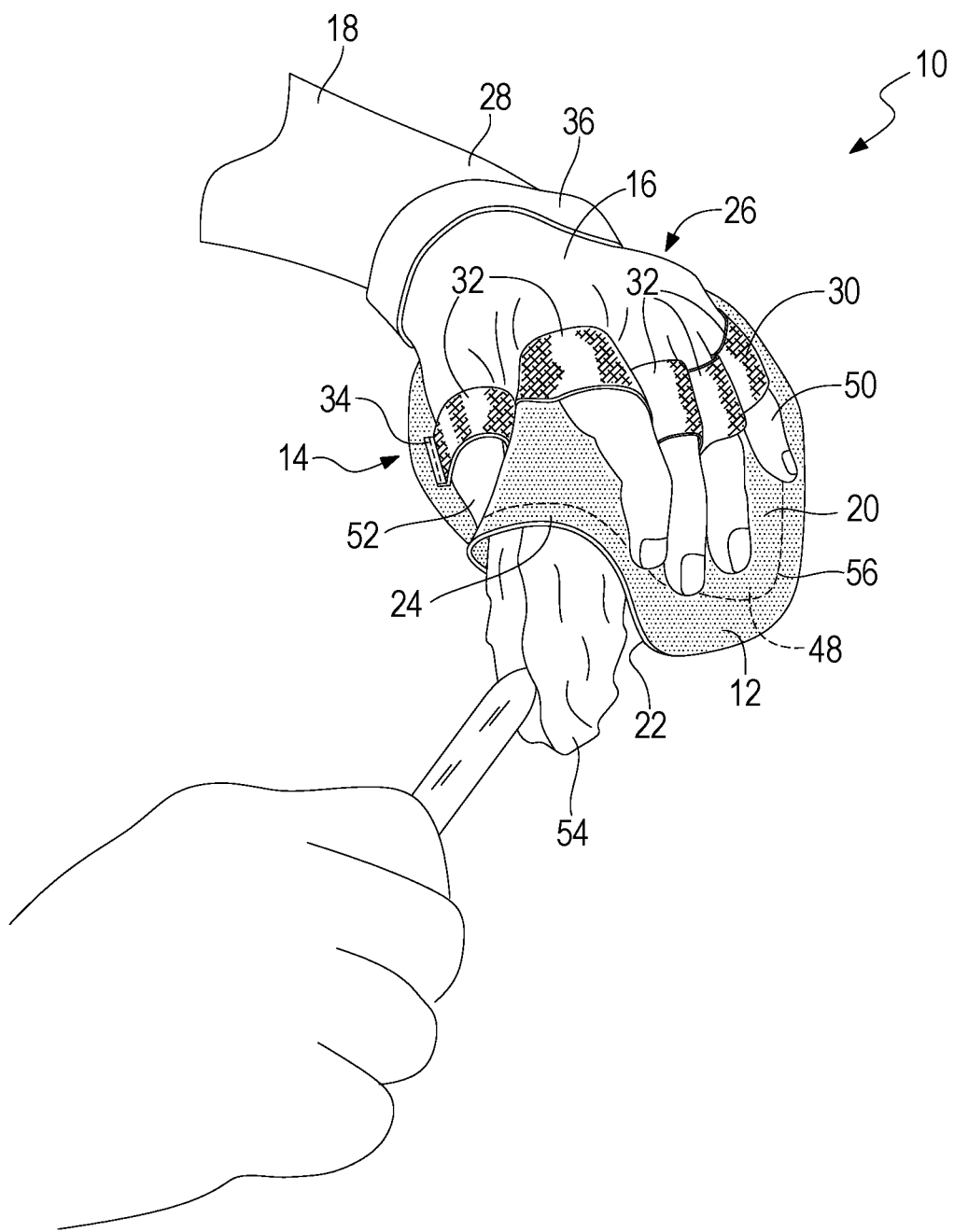
FIG. 1 is a perspective view of the present invention shown in operative connection.

With regard to reference numerals used, the following numbering is used throughout the drawings.

10 present invention
12 palm pad portion
14 palm of hand
16 hand
18 user
20 upper surface
22 lower surface
24 front portion
26 rear portion
28 wrist portion
30 webbing
32 finger loops
34 sewn portion
35 hole
36 wrist strap
38 first end
40 second end
42 upper side
44 lower side
46 hook and loop material
48 reinforcement pad
50 finger
52 thumb
54 oyster
56 stitch line

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 5 illustrate the present invention wherein an oyster shucking mitt is disclosed and which is generally indicated by reference number 10.

Figure 2:
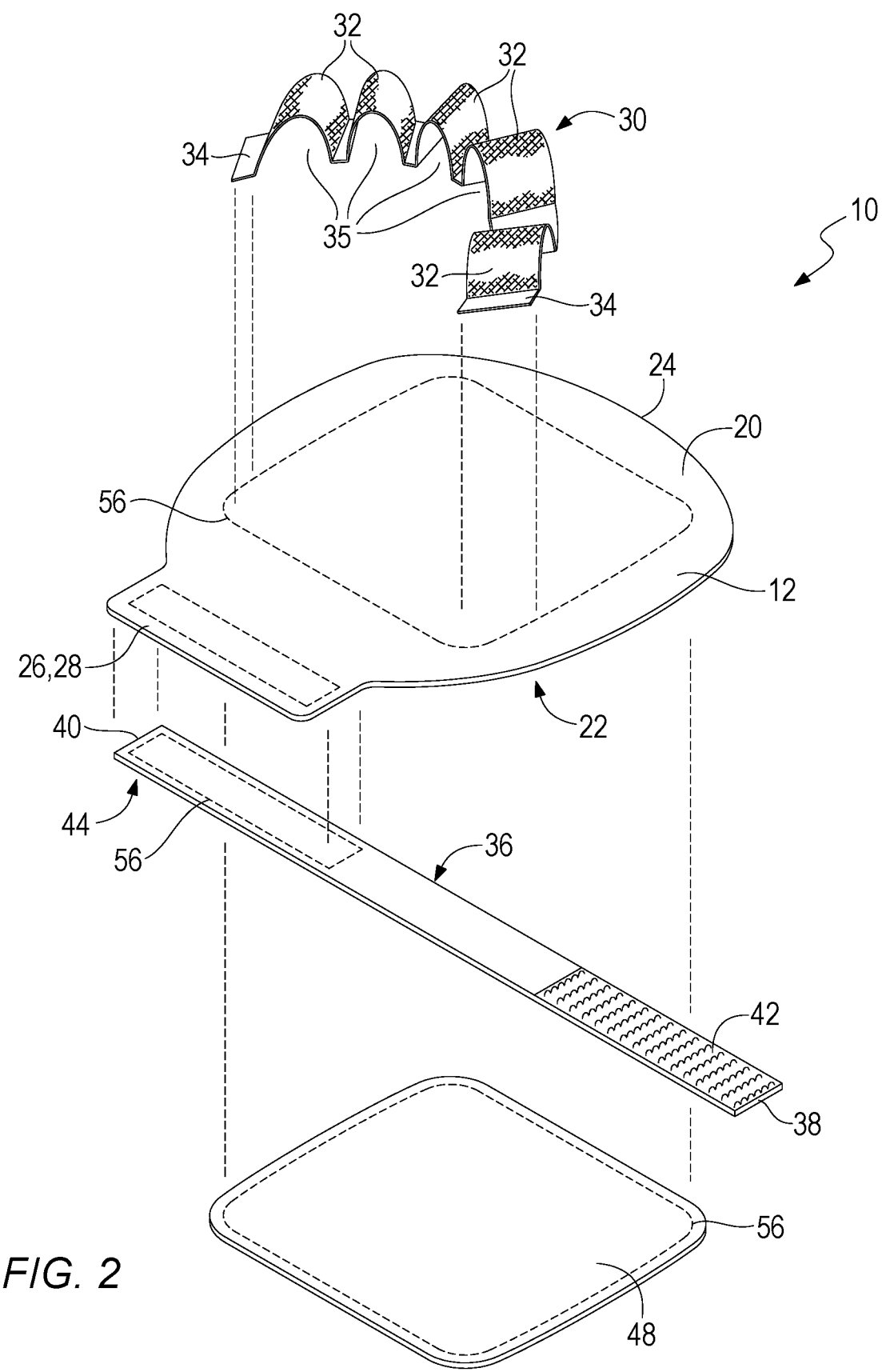
FIG. 2 is an exploded perspective view of the present invention.

Turning to FIGS. 1-2, therein is shown the present invention 10 having a pad portion 12 which covers a palm 14 of a hand 16 of a user 18 wherein the pad 12 has an upper side surface 20 and a lower side surface 22 and having a wider front portion 24 and a narrower or rear portion 26 which narrows down in width to accommodate and mate to the wrist 28 of a user 18. Also shown attached to the upper side 20 of the pad 12 is webbing 30 forming a plurality of finger loops 32 wherein a finger opening or hole 35 is provided for each finger 50 of the user 18 including the thumb 52 so that the pad 12 can be secured to the palm 14 of a hand 16 of a user 18 and also including portions 34 for being sewn or otherwise attached to the upper surface 20 of the pad 12 so that the webbing 30 is tightly and securely attached to the pad 12 of the present invention 10. A stitch line is shown at 56. Finger loops 32 are substantially disposed over and cover a full length of the proximal phalanges area or bones of the fingers 50 and thumb 52. The wrist portion 26 of the pad 12 of the present invention 10 includes a wrist strap 36 having opposing ends 38, 40 and having upper and lower sides 42,44 wherein mating hook and loop material 46 is attached to the opposing ends of strap 36 so that the strap can be wrapped around and over the outside of a wrist 28 of a user 18 to provide additional means for securing the pad 12 to hand 16 of a user 18 with the rear portion 22 being underneath or on the inside portion of the wrist 28. Also shown is a reinforcement pad 48 sized and shaped to be attached the underside 22 of the pad 12 for providing additional reinforcement for use in holding an oyster 54 in the hand 16 of a user 18. In FIG. 1, the hand 16 of a user 18 is shown palm 14 down, however, in actual usage when shucking an oyster 54 the palm 14 could be turned over so as to be disposed upwardly during the shucking process which some users may prefer to do. The oyster 54 is shown in direct contact with the reinforcement pad 48 in order to protect the hand 16 of a user 18.

Turning to FIG. 3, therein is shown a top view of the present invention 10 showing the pad 12 having the webbing 30 attached to its upper surface 20 within which the fingers of the hand 16 of a user 18 can be inserted. Also shown are the portions 34 which can be used to sew the webbing 30 to the pad 12 along with the narrowed wrist portion 28 on a rear of the pad 12 including the wrist strap 36.

Turning to FIG. 4, therein is shown an underside of the present invention 10 showing the pad 12 including the reinforcement pad 48 shown attached to the under lower side 22 of pad 12 along with the wrist strap 36 having and showing an end 40 including mating hook and loop material 46 being attached to each other to provide additional securement means for attaching the pad 12 onto the hand 16 and wrist of a user 18.

Turning to FIG. 5, therein is shown the webbing 30 which is a single continuous piece of strong, closely woven fabric forming loops 32 forming individual holes 35 for the fingers and thumb of the user along with pad 12, reinforcement pad 48 and sewn portion 34.

The pad 12 and reinforcement pad 48 are expected to be made of rubber of like tough flexible waterproof material that can be easily cleaned without absorbing water and germs common to this industry and without the presence of odor causing bacteria and related foul odors. The present invention 10 can be washed in soap and water and quickly air dried so that it can easily be kept clean and odor free. The present invention 10 may be made using sewing (see stitch line 56), bradding, gluing or any other method as would be done in the standard manner by one skilled in the art.

I claim:

1. A mitt for attachment to a hand of a user for shucking an oyster, comprising:
    a) a first pad sized and shaped to cover only an inside surface of the hand of the user, said first pad having an extended portion narrowed down in width and adapted to accommodate and mate to an adjacent portion of the wrist of said user;
    b) a plurality of finger loops disposed on an upper surface of said first pad for receiving each finger and a thumb of the hand of the user wherein said plurality of finger loops each is configured to cover only and are limited to a proximal phalanges area of each said finger of the hand of the user;
    c) a wrist strap attached to an outer surface of said extended portion for attaching a rear portion of said first pad to a wrist of the user; and
    d) a second pad disposed on a lower surface of said first pad for reinforcing said first pad and for gripping the oyster; and
    e) whereas said mitt when deployed does not enclose any portion of said user's hand other than said finger loops; wherein said first and second pads being flexible waterproof material; wherein a single piece of webbing forms said plurality of finger loops.

2. The mitt of claim 1, wherein said wrist strap having first and second ends each having mating hook and loop material thereon for connecting said first and second ends.

3. The mitt of claim 2, wherein said wrist strap is adjustable in length.

4. The mitt of claim 1, wherein sewing is used to join together said first pad, said plurality of finger loops, said wrist strap, and said second pad.

5. A method for assembling a mitt for attachment to a hand of a user for shucking an oyster, comprising the steps of:
    a) providing a first pad sized and shaped to cover only an inside surface of the hand of the user;
    b) forming a plurality of finger loops on an upper surface of the first pad for receiving each finger and a thumb of the hand of the user wherein said plurality of finger loops each cover only and are limited to a proximal phalanges area of each said finger of the hand of the user;
    c) providing a wrist strap for attaching a rear portion of the first pad to a wrist of the user; and
    d) providing a second pad on a lower surface of the first pad for reinforcing the first pad and for gripping the oyster; and
    e) the step of the user inserting the fingers through said finger loops with said pads adjacent the palm of said user, and then chucking oysters; further comprising the step of forming the first and second pads of flexible waterproof material; further comprising the step of providing a single piece of webbing for forming the plurality of finger loops.

6. The method of claim 5, wherein the wrist strap has first and second ends each having mating hook and loop material thereon for connecting the first and second ends.

7. The method of claim 5, further comprising the step of adjusting the length of the wrist strap.

8. The method of claim 5, wherein the rear portion of the first pad is narrower than a front portion of first pad.

9. The method of claim 5, further comprising the step of sewing the first pad, the plurality of finger loops, the wrist strap; and the second pad together.

\* \* \* \* \*